United States Patent [19]
Edgeller et al.

[11] Patent Number: 6,082,809
[45] Date of Patent: Jul. 4, 2000

[54] ENCLOSURE FOR A PORTABLE MACHINE

[75] Inventors: Peter Edgeller, Southport; Jamie Robert Wilson, Hambleton, both of United Kingdom

[73] Assignee: Ingersoll-Rand Company, Woodcliff Lake, N.J.

[21] Appl. No.: 09/175,268

[22] Filed: Oct. 20, 1998

[30]     Foreign Application Priority Data

Jul. 24, 1998 [GB] United Kingdom .................. 9816273

[51] Int. Cl.⁷ ................. B60J 7/00; B60P 3/00; B60P 7/00; B62D 33/04
[52] U.S. Cl. ................ 296/181; 296/39.3; 296/24.1; 296/198; 296/901
[58] Field of Search .................. 296/181, 168, 296/173, 24.1, 39.3, 901, 37.14, 37.1, 198; 280/204, 153.5, 154, 848; 180/69.24

[56]         References Cited

U.S. PATENT DOCUMENTS

| | | |
|---|---|---|
| D. 58,917 | 9/1921 | Labourdette . |
| D. 58,918 | 9/1921 | Labourdette . |
| D. 91,938 | 4/1934 | Goin et al. . |
| D. 100,485 | 7/1936 | Broomall . |
| D. 144,748 | 5/1946 | Weissberg ............................ 296/168 |
| D. 389,439 | 1/1998 | Friedrich . |
| D. 389,785 | 1/1998 | Guzak . |
| D. 391,526 | 3/1998 | Kass et al. . |
| D. 396,668 | 8/1998 | Ewald . |
| 2,033,731 | 3/1936 | Nallinger . |
| 2,157,793 | 5/1939 | Lang . |
| 2,197,503 | 4/1940 | Martin . |
| 2,684,204 | 7/1954 | Lamb . |
| 2,881,860 | 4/1959 | Ternes . |
| 2,894,783 | 7/1959 | Bird ...................................... 296/168 |
| 2,964,349 | 12/1960 | Picking, Jr. et al. . |
| 3,143,373 | 8/1964 | Fordyce . |
| 4,211,337 | 7/1980 | Weavers et al. . |
| 4,216,990 | 8/1980 | Musgrove et al. . |
| 4,372,568 | 2/1983 | Campbell ............................ 280/63 |
| 4,396,208 | 8/1983 | Koch . |
| 4,420,057 | 12/1983 | Omote et al. . |
| 4,502,725 | 3/1985 | Wiant .................................. 296/181 |
| 4,537,441 | 8/1985 | McCleary . |
| 4,615,464 | 10/1986 | Bryns . |
| 4,681,178 | 7/1987 | Brown . |
| 4,690,204 | 9/1987 | Reichel et al. . |
| 4,828,132 | 5/1989 | Francis, Jr. et al. . |
| 4,932,490 | 7/1990 | Dewey . |
| 4,982,971 | 1/1991 | Marin .............................. 296/181 X |
| 5,088,616 | 2/1992 | Susko et al. . |
| 5,178,435 | 1/1993 | Anderson . |
| 5,417,465 | 5/1995 | Koppenstein et al. . |
| 5,518,262 | 5/1996 | Hutchinson et al. .................. 280/475 |
| 5,527,081 | 6/1996 | Rausch et al. . |
| 5,632,522 | 5/1997 | Gaitan et al. . |
| 5,653,494 | 8/1997 | Cleall et al. ........................... 296/182 |
| 5,673,956 | 10/1997 | Emery . |
| 5,681,074 | 10/1997 | Christensen . |
| 5,725,272 | 3/1998 | Jones . |

*Primary Examiner*—D. Glenn Dayoan
*Assistant Examiner*—Patricia Engle
*Attorney, Agent, or Firm*—Michael M. Gnibus

[57]         ABSTRACT

An enclosure for a portable machine includes a lower body having two or more wheels rotatably mounted thereto, the lower body including an interior region adapted for receiving the portable machine. The enclosure includes an upper body overlying the lower body for enclosing the portable machine within the interior region and a towing element attached to the lower body for pulling the enclosure over a surface, such as a road. The upper and lower bodies substantially comprise polymer materials for minimizing the amount of noise emanating from the enclosure during operation of the portable machine. The lower body may include materials selected from the group consisting of polyethylene and nylon, and the upper body may include acrylonitrile butadiene styrene (ABS). The upper and lower bodies may be formed using a molding process, such as a vacuum molding process. In certain embodiments, the upper body is hingedly secured to the lower body and is movable with respect to the lower body for selectively accessing the portable machine.

28 Claims, 12 Drawing Sheets

ENCLOSURE FOR A PORTABLE MACHINE

The present application claims benefit under 35 U.S.C. Section 119 of United Kingdom Patent Application Ser. No. 9816273.8, filed Jul. 24, 1998.

BACKGROUND OF THE INVENTION

1. Field of the Invention

The present invention relates to an enclosure for a portable machine and more specifically relates to a trailer assembly for a portable air compressor.

2. Description of the Prior Art

Portable air compressor systems generally include an air compressor mounted upon a trailer and having a protective enclosure or cover secured over the top of the compressor. The trailer may include wheels and a tow bar so that the trailer may be easily moved between job sites. Upon arriving at a job site, the air compressor may be operated to provide compressed air for pneumatic tools and other devices.

A trailer for housing a portable air compressor is disclosed in commonly owned U.S. Pat. No. 5,518,262. The trailer includes a lower frame having two wheels rotatably mounted thereto and a towing assembly mounted to a front end of the lower frame for towing the compressor between job sites. A machine, such as an air compressor, is secured atop the lower frame. The trailer typically includes a cover secured atop the lower frame, the cover having one or more hatches that may be selectively opened for gaining access to the air compressor. The cover protects the air compressor and other internal components, such as the engine, control panel, etc., necessary for operating the compressor. The cover generally muffles some of the noise produced during operation of the compressor. The trailer assembly disclosed in the '262 patent has proven to be extremely reliable and serviceable. This is due, in part, to the heavy-duty steel used to construct the trailer and the cover. Although the heavy-duty steel construction remains a very popular and valuable feature, there is a need for a trailer for a portable machine that is lightweight, aerodynamic, corrosion free, modular and highly mobile.

SUMMARY OF THE INVENTION

In accordance with certain preferred embodiments of the present invention, an enclosure for a portable machine includes a lower body having two or more wheels rotatably mounted thereto. The lower body has an interior region adapted for receiving the portable machine. The enclosure also includes an upper body overlying the lower body for enclosing the portable machine within the interior region of the lower body and a towing element attached to the lower body for pulling the enclosure over a surface, such as a road. The towing element includes a tow bar connected to the lower body and projecting from a front end thereof. In one preferred embodiment, the tow bar is adjustable for modifying the angle of the tow bar or the height of the front end of the lower body above the surface.

The enclosure is preferably designed to muffle and/or minimize the amount of noise that escapes from the enclosure. To this end, the upper and lower bodies preferably comprise polymer materials that are relatively poor deflectors of noise so as to minimize the amount of noise emanating from the enclosure during operation of the portable machine. Desirably, the lower body includes materials selected from the group consisting of polyethylene and nylon and the upper body includes acrylonitrile butadiene styrene (ABS). The upper and lower bodies may be formed using a molding process, such as a vacuum molding process. In preferred embodiments, the upper body may have a different coefficient of thermal expansion than the lower body.

The portable machine is preferably secured within the interior region of the lower body and covered by the upper body, the upper and lower body essentially encasing the machine. There are preferably no gaps between the upper body and the lower body, thereby eliminating passageways through which the noise may escape. The upper body is preferably secured to the lower body, and is more preferably hingedly secured to the lower body so that the upper body is movable with respect to the lower body for selectively accessing the portable machine.

In certain preferred embodiments, the lower body includes one or more integrally molded location channels for positioning and mounting fenders to the lower body. Each fender preferably includes one or more flanges projecting therefrom and the location channel includes one or more recesses formed in the lower body, whereby the recesses are adapted for receiving the flanges projecting from the fenders.

The lower body preferably includes an alignment channel integrally molded into an upper portion thereof for receiving at least one bottom edge of the upper body. The engagement of the at least one bottom edge of the upper body and the alignment channel generally aligns the upper body relative to the lower body. The alignment channel provides lateral support for the at least one bottom edge of the lower body for preventing collapse and/or deformation of the upper body.

The enclosure preferably has an aerodynamic shape for improving the flow of air over the enclosure. The aerodynamic shape enhances the stability of the enclosure when the enclosure is being towed. The enhanced stability of the enclosure allows the enclosure to be towed at higher speeds. In preferred embodiments, the enclosure has a substantially teardrop shaped outer skin which curves in a downward direction upon moving from the front end of the enclosure to the rear-end thereof. The use of polymer materials for the enclosure, as opposed to using heavier metal materials, significantly reduces the overall weight of the enclosure. In certain preferred embodiments, the enclosure including the portable machine has an overall weight of approximately 375–425 kilograms. Thus, smaller vehicles than ordinarily required for conventional portable machine trailers may be utilized to tow the relatively lightweight enclosure of the present invention.

Other objects, advantages and features of the present invention will be readily apparent to one skilled in the art from the following detailed description of preferred embodiments when taken in conjunction with the accompanying drawings showing certain preferred embodiments of the present invention.

DETAILED DESCRIPTION OF PREFERRED EMBODIMENTS

Figure 1:
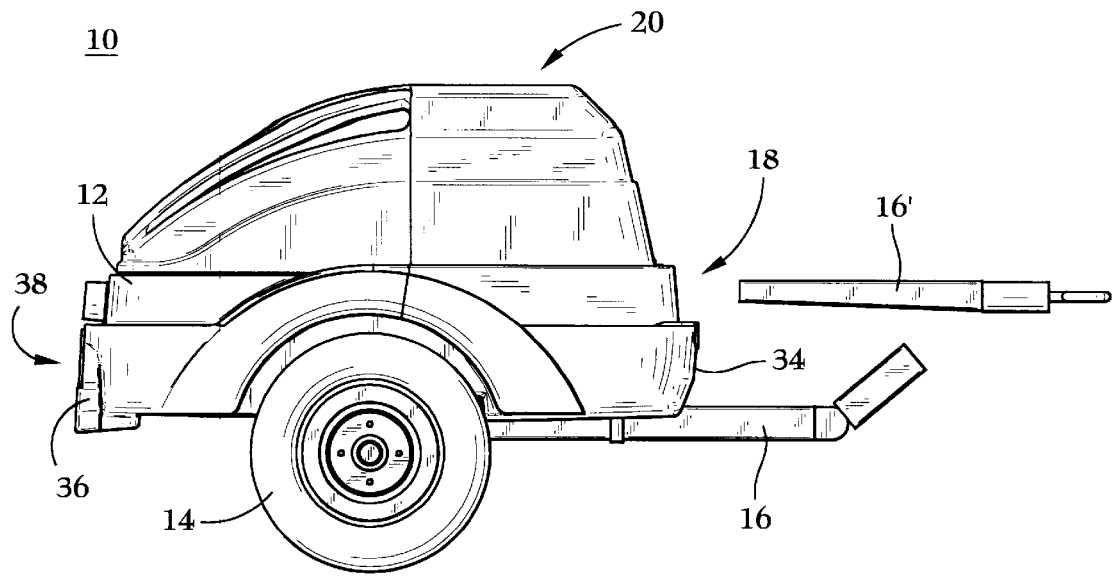
FIG. 1 shows a side view of an enclosure for a portable machine including a lower body, an upper body and a towing element, in accordance with one preferred embodiment of the present invention.

FIGS. 1–6 show various views of an improved enclosure for a portable machine in accordance with certain preferred embodiments of the present invention. The enclosure generally comprises a trailer 10 including a lower body portion 12 having wheels 14 rotatably mounted thereto. The lower body portion 12 includes a tow bar 16 secured to the trailer 10 and projecting from a front end 18 thereof for towing the trailer. In other embodiments, the tow bar may include a flat version 16' having a fixed height above the ground or a raised version 16 which is capable of being adjusted so as to modify the height of the tow bar above the ground. The lower body portion 12 preferably comprises a polymer, such as a high-density polyethylene. In other preferred embodiments, the lower body portion 12 may include other moldable materials, such as a medium density polyethylene or nylon. The trailer 10 also includes an upper body 20 that also preferably comprises a polymer material. The upper body 20 may include acrylonitrile butadiene styrene (ABS), a polymer material having a different coefficient of thermal expansion than the lower body 12. In one preferred embodiment, the upper body 20 is molded using a vacuum molding process. The utilization of polymer materials for the trailer 10 enhances sound attenuation due to the natural ability of polymers to muffle sound. As is well known to those skilled in the art, polymers muffle sounds more efficiently than metals because they have a less dense molecular structure.

Figure 2:
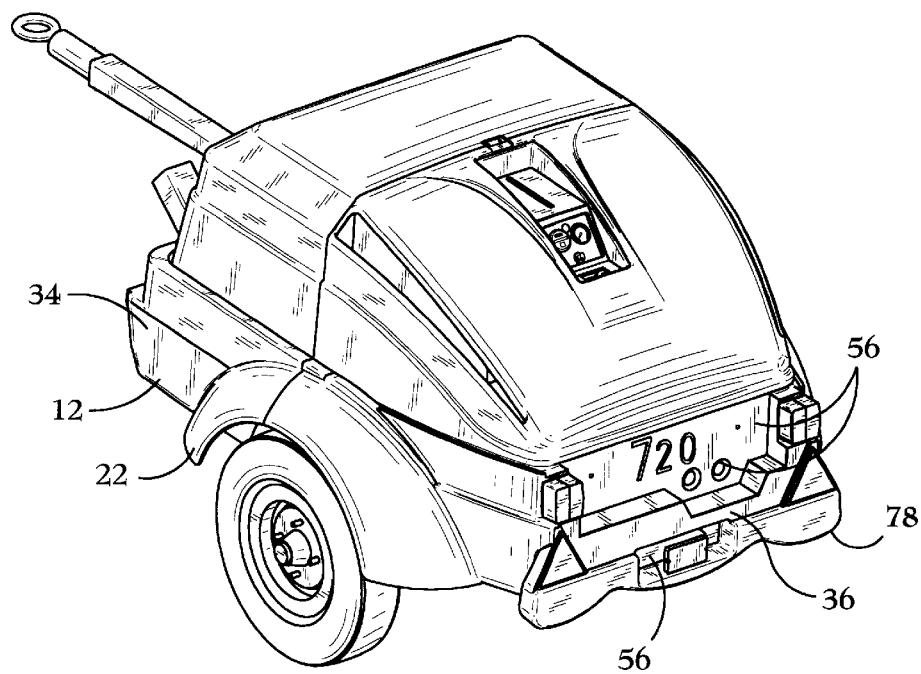
FIG. 2 shows a rear perspective view of the enclosure of FIG. 1.

Referring to FIG. 2, the lower body portion 12 includes a stylized external design having rounded edges, corners and fenders 22. The rounded shape of the lower body 12 portion provides a more aerodynamic structure that has a more aesthetically pleasing look and feel. In addition, the generally rounded design is safer because it is devoid of the sharp edges typically present in metal trailers. As such, the rounded design of the trailer 12 improves the overall performance and safety of the portable trailer.

Figure 3:
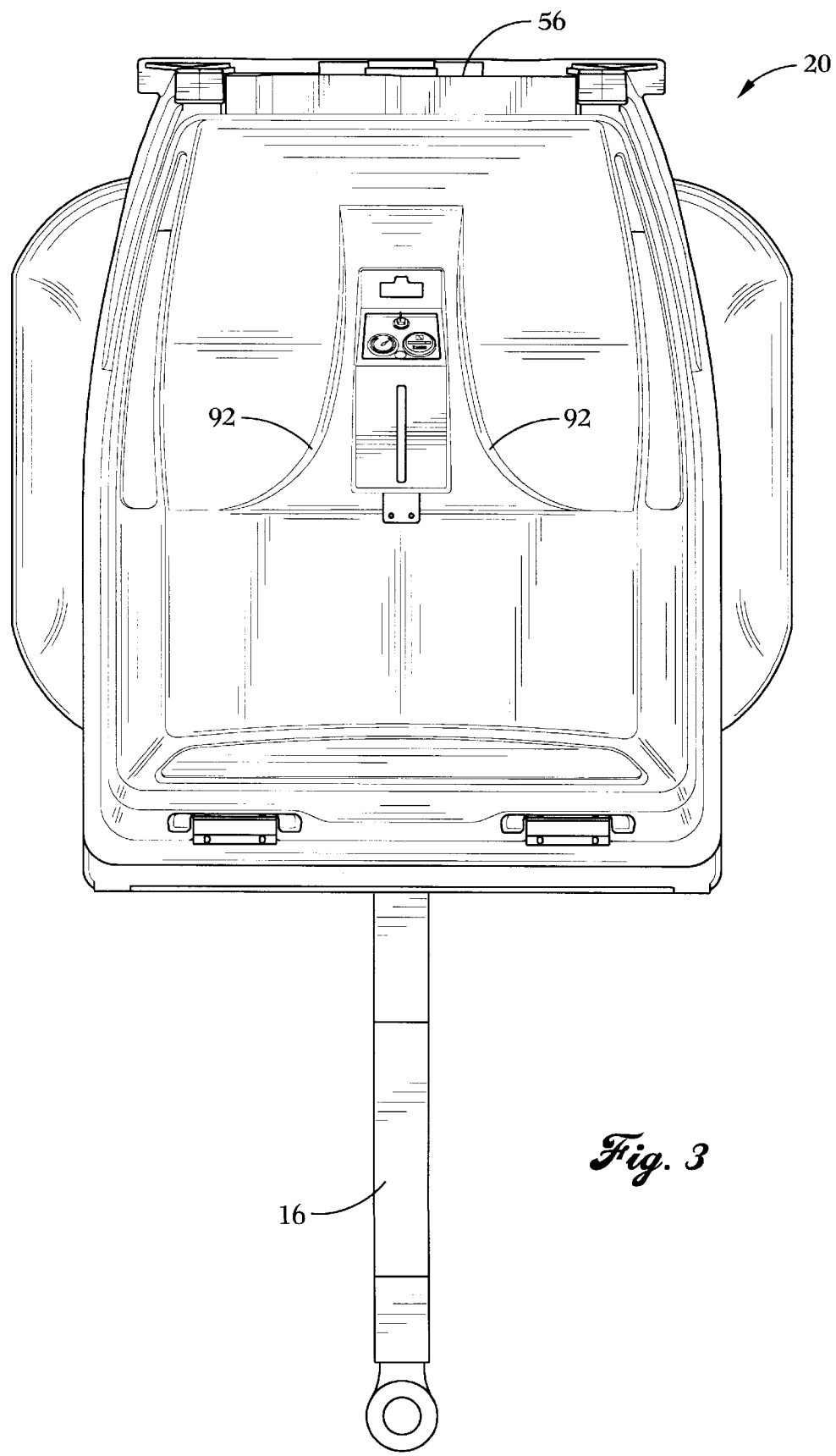
FIG. 3 shows a top view of the enclosure of FIG. 1.

Referring to FIGS. 1–3, the tear drop shape of the trailer generates favorable airflow patterns when the trailer is being towed, thereby enhancing stability. Moreover, the use of polymer materials for the trailer, as opposed to metal, reduces the overall weight of the trailer. In certain preferred embodiments, the trailer comprising polymer materials has an overall weight of between approximately 375–425 kilograms, or about 20% lighter than prior art trailers using metal. As a result, smaller vehicles may be used to tow the lighter weight trailers disclosed herein. In addition, the reduced weight of the trailer allows the trailer to be towed at greater speeds and improves overall stability. Further, the use of polymer materials for the upper and lower bodies provides for better sound attenuation.

Figure 10:
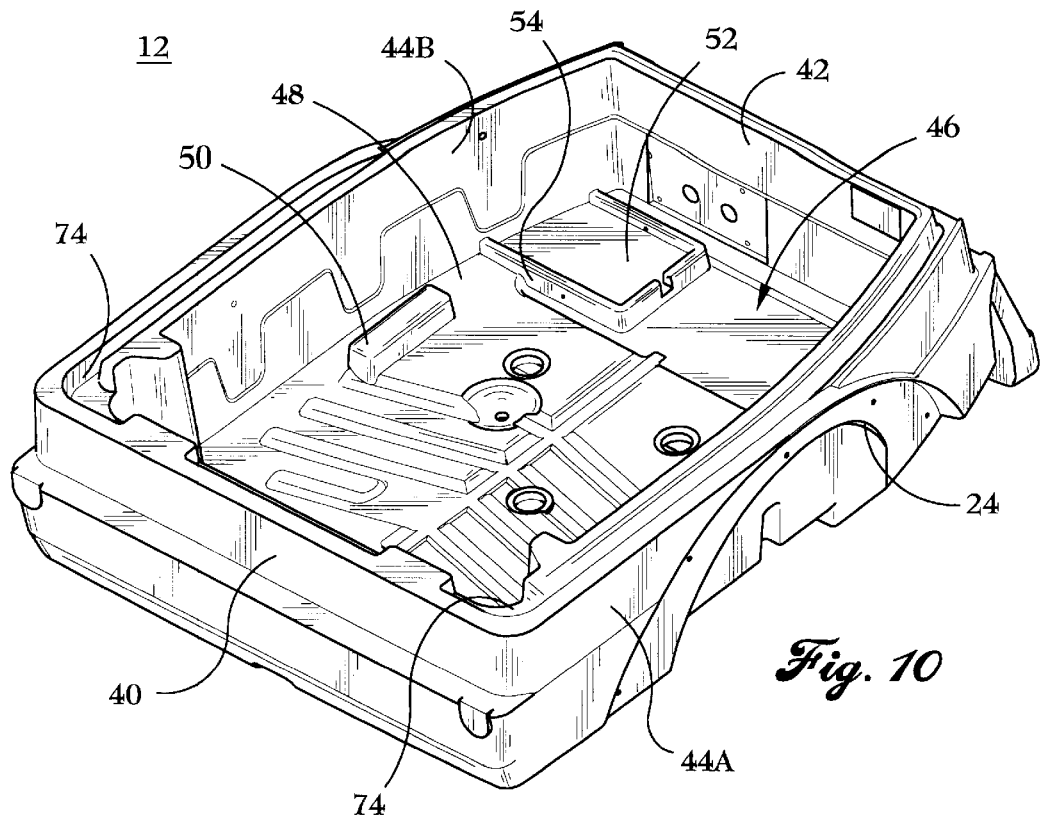
FIG. 10 shows a perspective top view of the lower body of FIG. 1, in accordance with certain preferred embodiments of the present invention.
Figure 11:
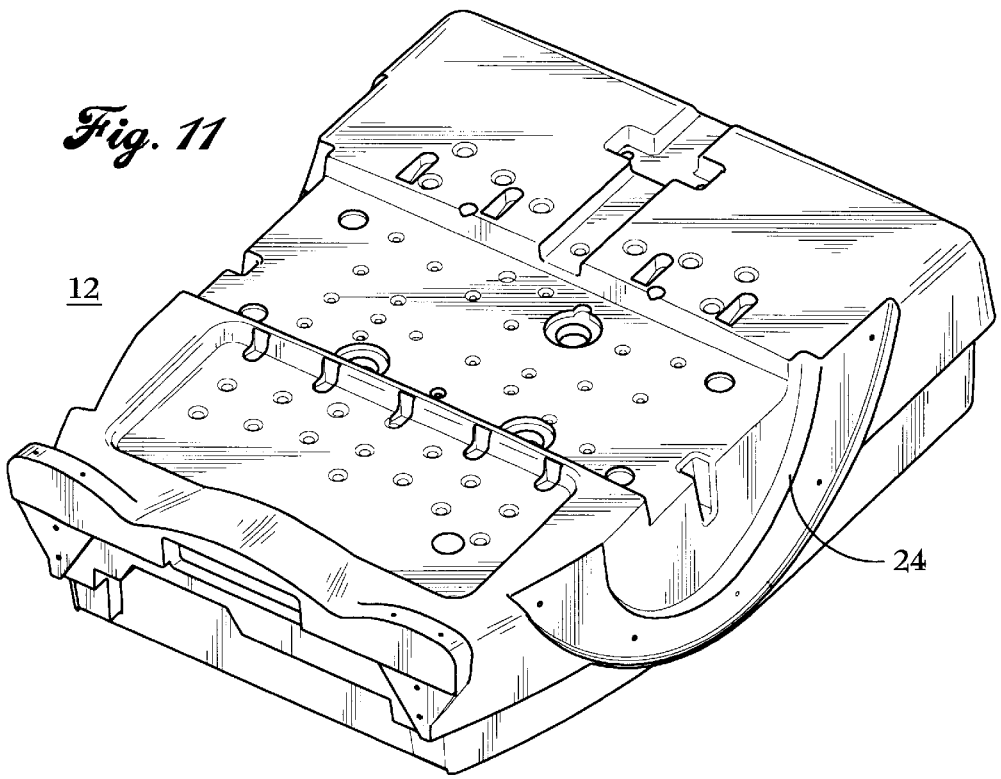
FIG. 11 shows a perspective bottom view of the lower body of FIG. 10.

Referring to FIGS. 10 and 11, the lower body portion 12 includes one or more location channels 24 for positioning and mounting the fenders (FIG. 1). Each location channel 24 includes one or more recesses formed in the lower body 12 so that flange portions of each fender may be pushed into the recess. The recesses serve to both properly align the fenders and secure the fenders in place. Thus, the recessed location channels 24 provide a dramatic improvement over present methods for attaching fenders to metal trailers. These prior art methods typically require an assembler to punch alignment holes through the metal body, align the fender with the punched holes and then secure the fender in place with screws or bolts.

Figure 4B:
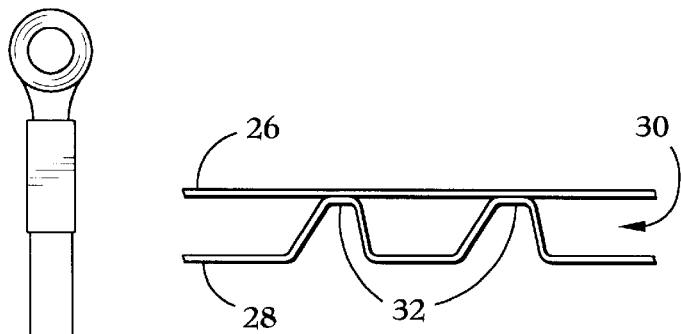
FIG. 4B shows a fragmentary cross sectional view of the lower body including an inner skin, an outer skin, and an air gap between the inner and outer skins for muffling sound generated during operation of the portable machine, in accordance with certain preferred embodiments of the present invention.
Figure 4A:
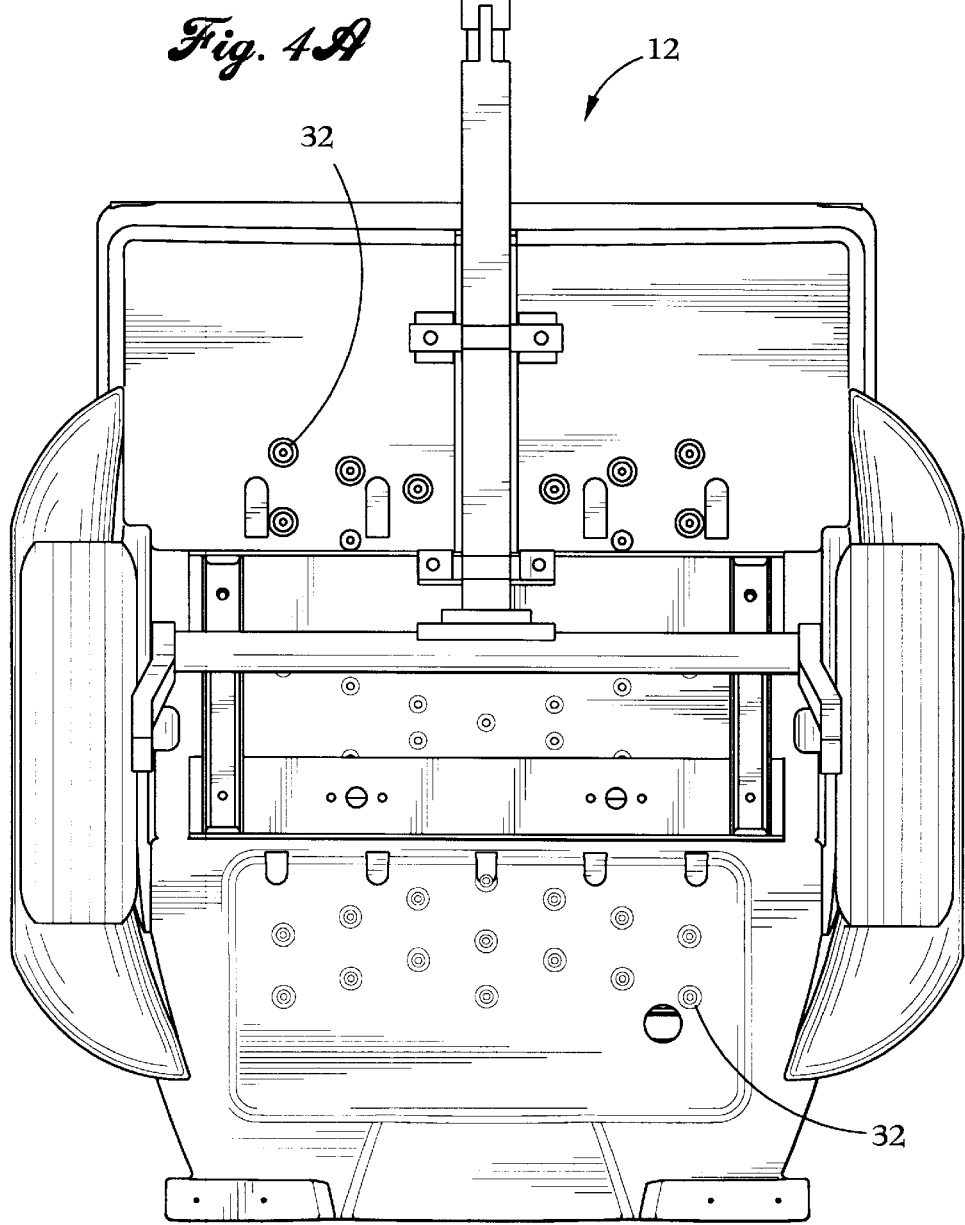
FIG. 4A shows a bottom view of the enclosure of FIG. 1.
Figure 5:
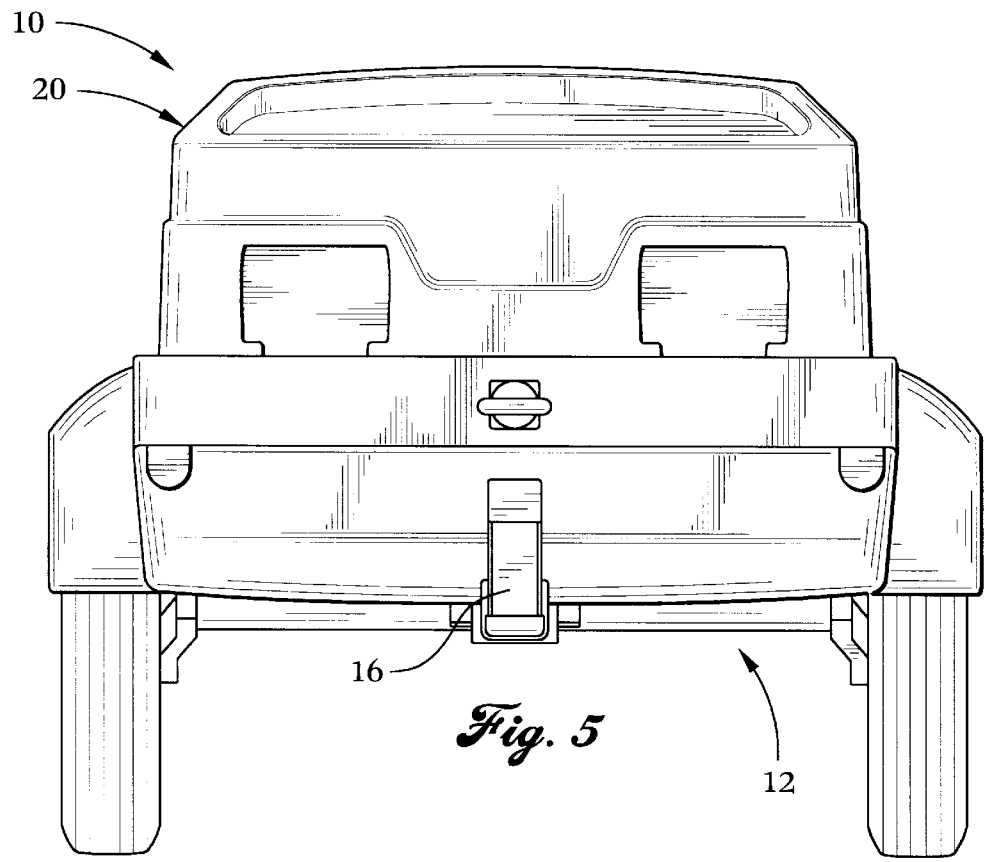
FIG. 5 shows a front view of the enclosure of FIG. 1.

Referring to FIGS. 4A and 4B, the lower body portion 12 includes an inner skin 26 and an outer skin 28. The space 30 between the inner and outer skins 26 and 28 is preferably filled by air, also referred to as an air gap, which generally muffles and/or attenuates the sounds produced by the air compressor and the engine. The air gap is preferably between approximately 15–35 mm and, in one particular embodiment, is more preferably between about 15–25 mm. In certain preferred embodiments, selected portions of the inner and outer skins are in permanent contact with one another so as to minimize unwanted movement and vibration of the skins. These selected sections of the inner and outer skins 26 and 28 are molded together to provide integrated supports 32. A rotational molding process may accomplish this. During the rotational molding process, selected portions of the outer skin 28 are forced in an upward direction toward the inner skin 26 so that the outer skins are shaped as conical portions and secured to the inner skin to provide the integrated supports 32. The integrated supports 32 enhance the structural integrity of the design by damping vibrational movement of the inner and outer skins of the lower body portion.

Referring to FIGS. 1 and 2, the lower body portion also includes front protective bumpers 34 and rear protective bumpers 36. The front and rear bumpers 34 and 36 are integrally molded to the lower body 12 so as to form a continuous, unitary structure. As shown in FIG. 1, the front end 18 of the lower body 12 has a distinct step 34 at a bottom portion thereof which projects beyond the remainder of the lower body. This distinct step 34 serves as the front bumper for protecting the lower body 12 from bumps and collisions. The lower body 12 also includes the rear bumper 36 integrally molded to a rear end 38 of the lower body 12. However, in other preferred embodiments, the rear bumper may be attached to the lower body by forming one or more recesses or channels in the rear end of the lower body and then inserting mating portions of the bumper into the one or more recesses.

Referring to FIG. 10, the lower body includes four side walls designated front wall 40, rear wall 42, and sides walls 44A and 44B, which define an interior region 46 thereof adapted for securing, inter aria, an air compressor, an engine and a battery. In one particular embodiment, the floor 48 of the interior region 46 includes a projection or key 50 integrally molded therein which is sized and shaped to fit within a recess formed in the bottom of a fuel tank (not shown). Preferably, the outer dimensions of the projection 50 substantially match the inside dimensions of the recess in the fuel tank so that the fuel tank fits snugly over the projection 50. The projection 50 on the floor 48 of the lower body 12 and the recess in the fuel tank cooperatively secure the fuel tank from moving in lateral directions, i.e. along the X and Y axes. A securing element, such as a retaining strap, may be placed over the fuel tank and secured to the lower body 12 for preventing the fuel tank from moving along the Z-axis.

Referring to FIG. 10, the lower body also has a battery mounting area 52 molded into the floor 48 thereof. The battery mounting area 52 includes a low wall 54 that surrounds the mounting area. The low wall 54 surrounds the battery (not shown) and prevents the battery from moving in lateral directions. Although the fuel tank, the air compressor, the battery and other components may be in direct contact with the floor 48 of the lower body 12, the polymer materials of the lower body will not deform during operation of the air compressor because the maximum operating temperature of the components is less than the melting temperature of the polymer materials.

Figure 6:
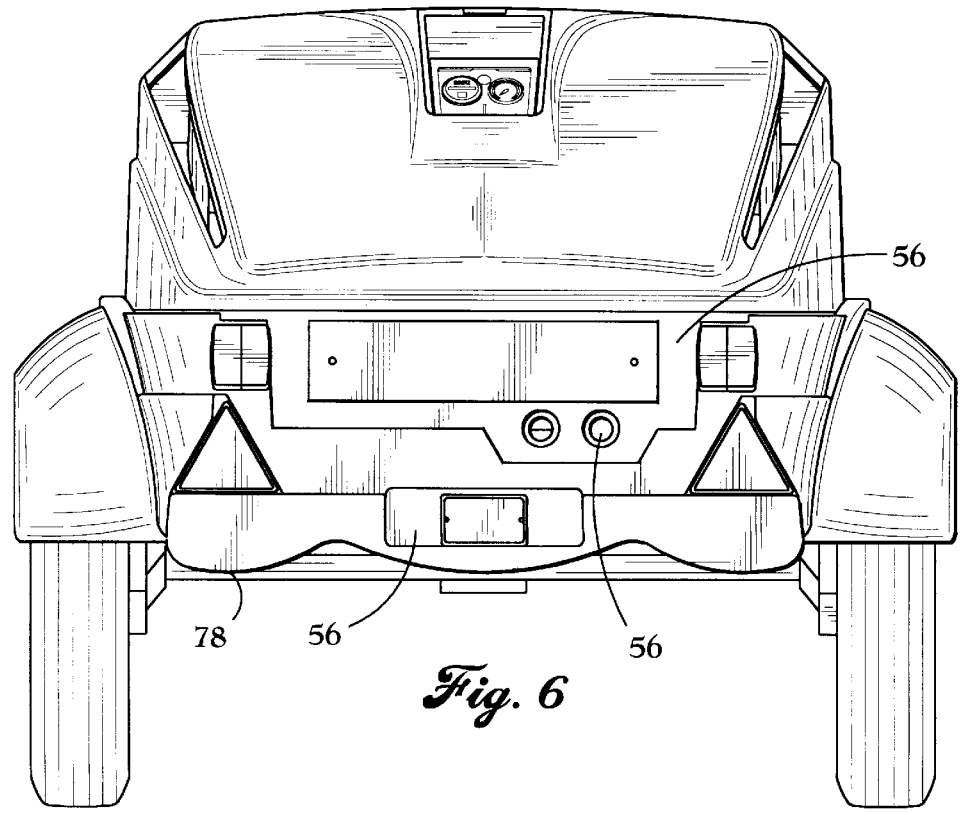
FIG. 6 shows a rear view of the enclosure of FIG. 1.

Referring to FIGS. 2 and 6, the lower body 12 has a plurality of recesses 56 molded into the outer surface thereof. At least one or more of the recesses 56 are preferably adapted for receiving lighting and reflector mounts. The use of the molded recesses 56 for the lights and reflectors greatly simplifies assembly of the trailer 10 because assemblers can easily align the light and reflector fixtures in the preformed recesses 56. The utilization of recesses for mounting the lights and reflectors also improves the durability of the trailer because recessed lights and reflectors do not project beyond the sides of the trailer and thus are less likely to receive dents and scratches.

Figure 7:
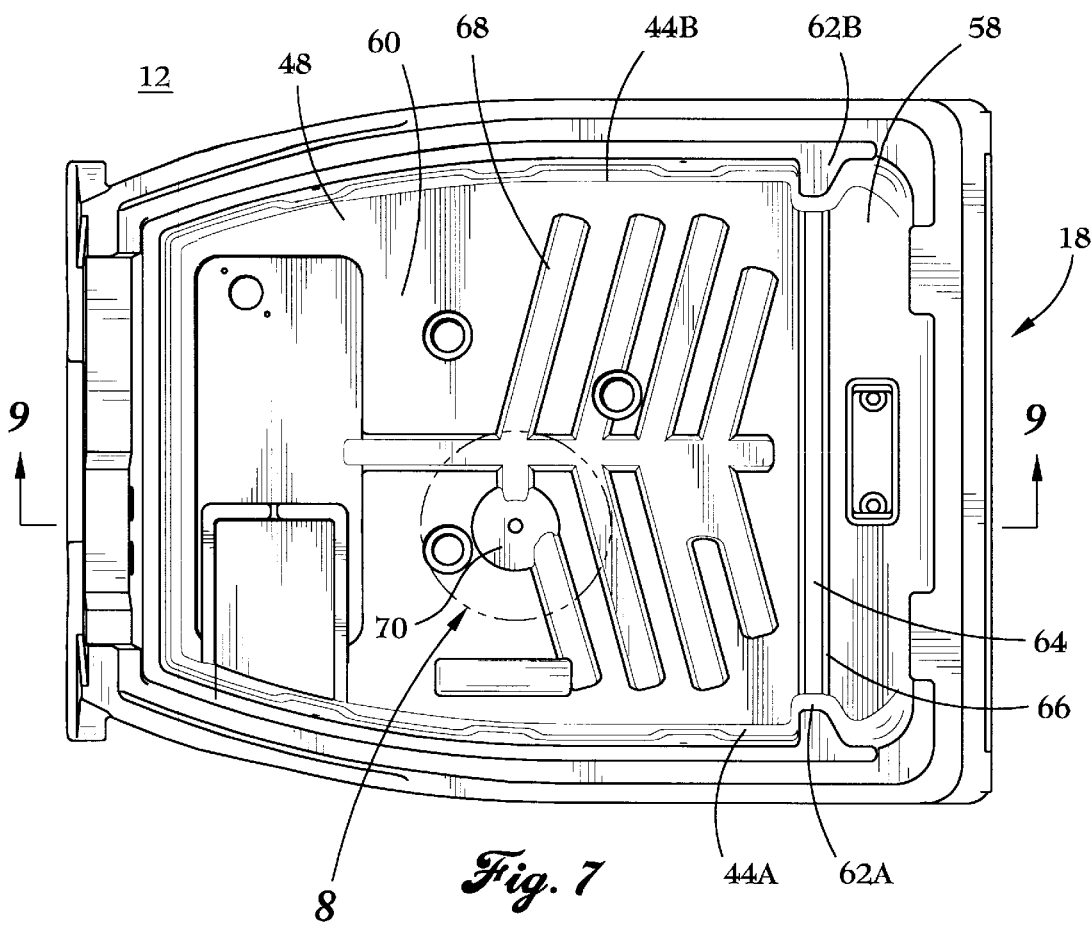
FIG. 7 shows a top view of the lower body including a drainage system for removing fluids from the lower body, in accordance with certain preferred embodiments of the present invention.

Referring to FIG. 7, the lower body 12 also includes a support structure for mounting oil and water coolers. The support structure preferably includes a dividing wall (not shown) which is secured inside the lower body 12 for separating oil and water cooler area 58 from the engine compartment area 60 of the lower body. In one particular embodiment, a separating wall (not shown) is secured in place by projections 62A and 62B which are molded into opposing side walls 44A and 44B of the lower body, preferably adjacent the front end 18 of the trailer. The lower body 12 may also have fluid barrier 64 formed therein which extends between the opposing projections 62A and 62B. The fluid barrier 64 preferably includes one or more raised flanges 66 which abut against a bottom portion of the dividing wall for preventing fluids from passing between the oil and water cooler area 58 and the engine compartment 60. The lower body may also include one or more drainage holes provided in the floor of the lower body, between the dividing wall and the front end 18 of the trailer. The drainage holes draw rain water and/or any other fluids, such as cooling fluids, away from the engine compartment 60 and discharge the fluids from the trailer.

Figure 8:
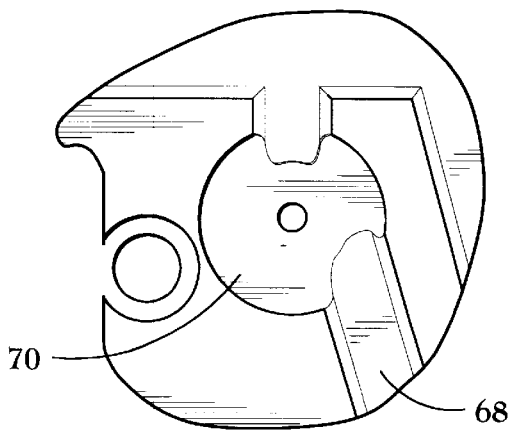
FIG. 8 shows a fragmentary top view of a portion of the drainage system of FIG. 7.
Figure 9:
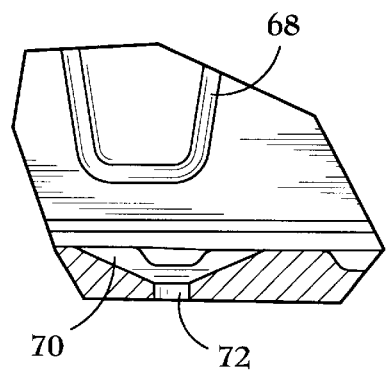
FIG. 9 shows a fragmentary cross-sectional view of the drainage system of FIG. 7.

Referring to FIGS. 7–9, the lower body also preferably includes a series of flow channels 68 and at least one drain 70 for removing oil and/or other fluids from the engine compartment 60. As shown in FIG. 9, the flow channels 68 are essentially concave shaped disruptions which are molded into the inner skin of the lower body, and which direct fluids towards drain 70 which is designed to collect fluids from the main drain point of the machine. At this particular point, the floor is molded into a conical shape and a hole at the center of the cone connects both the inner and outer skins. The drain plug 72 is normally closed, however, during maintenance operations, the drain plug may be opened so that fluids may be drained from the engine compartment 60. The area of the lower body surrounding the drain plug 72 may have a concave or conical shape for directing the fluids toward the drain plug. The flow channels 68 may also prevent vibration and noise because they disrupt the surface of the floor 48, which generally dampens movement and vibration of the floor.

Referring to FIG. 10, the lower body 12 also includes an alignment channel 74 molded into a top portion of the front wall 40 and the sides walls 44A and 44B for receiving one or more bottom edges 76 of the upper body 20. The engagement of the upper body 20 and the alignment channel 74 serves to align the upper body 20 with the lower body 12 during opening and closing of the trailer 10. The alignment channel 74 also enhances the structural integrity of the trailer by providing lateral support for the bottom edges 76 of the upper body 20 so as to prevent the collapse and/or deformation of the upper body 20. The channel 74 preferably has sufficient width to capture the bottom edge 76 of the upper body 20 at a wide range of operating temperature, thus providing for misalignment tolerances between the upper and lower body components. This alignment feature is particularly important in view of the fact that the upper and lower bodies may comprise different materials having different coefficients of thermal expansion.

Referring to FIGS. 2 and 6, the lower body may include a strengthened skid mounting portion 78 secured to the bumper 36. During operation the lower skid 78 is generally the first point to hit the ground or road when the trailer 10 is tilted. As such, the lower skid 78 preferably includes a durable material capable of withstanding any knocks and bumps that may occur during operation. In one particular embodiment, a metal plate or layer may be provided over the exterior surface of the lower skid in order to improve its durability. In other embodiments, the thickness of the material used to form the skid may be increased, or the durability of the material utilized in that area may be enhanced.

Figure 12A:
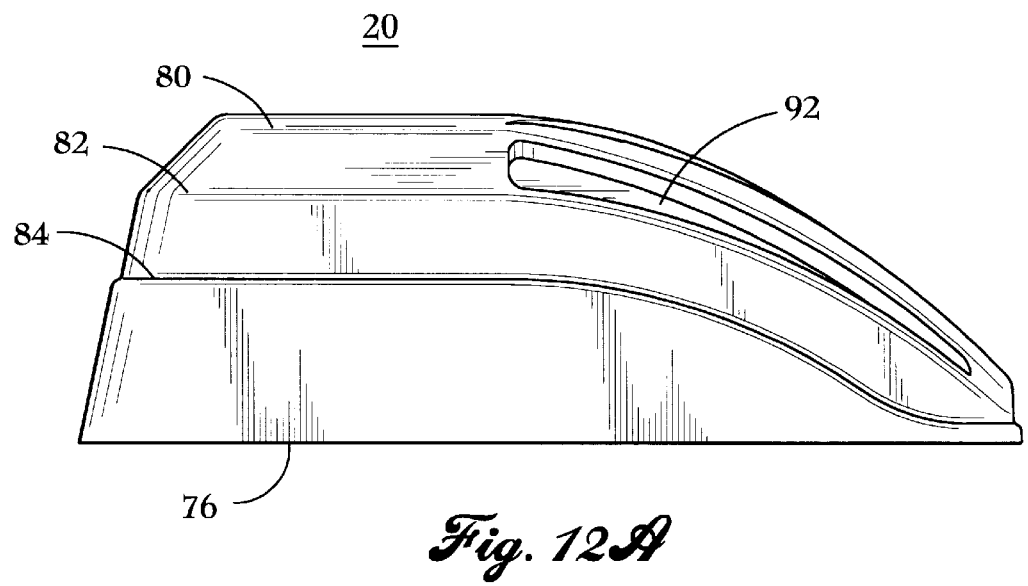
FIG. 12A shows a left side view of the upper body of FIG. 1.
Figure 12B:
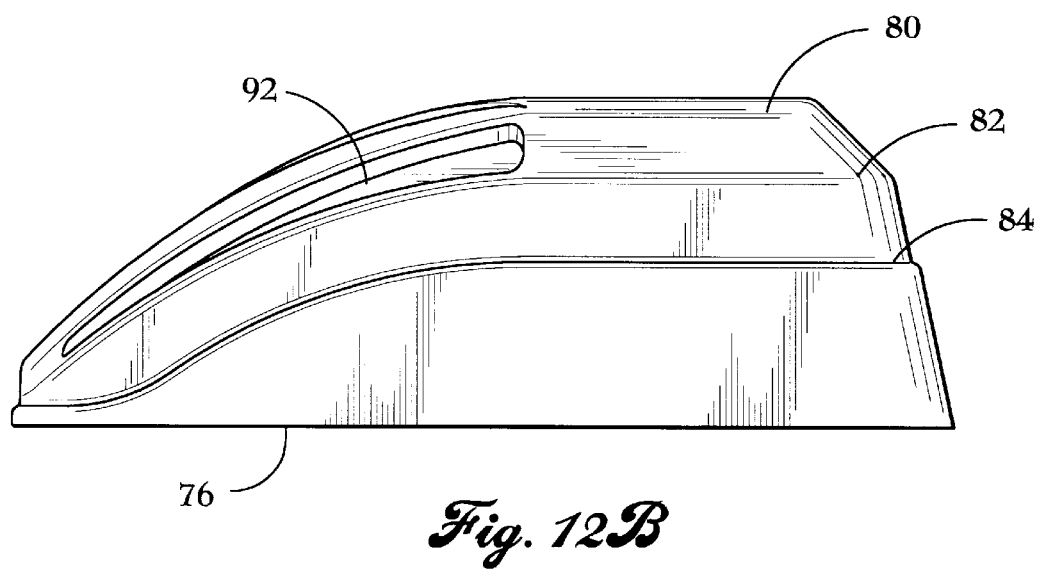
FIG. 12B shows a right side view of the upper body of FIG. 1.
Figure 13:
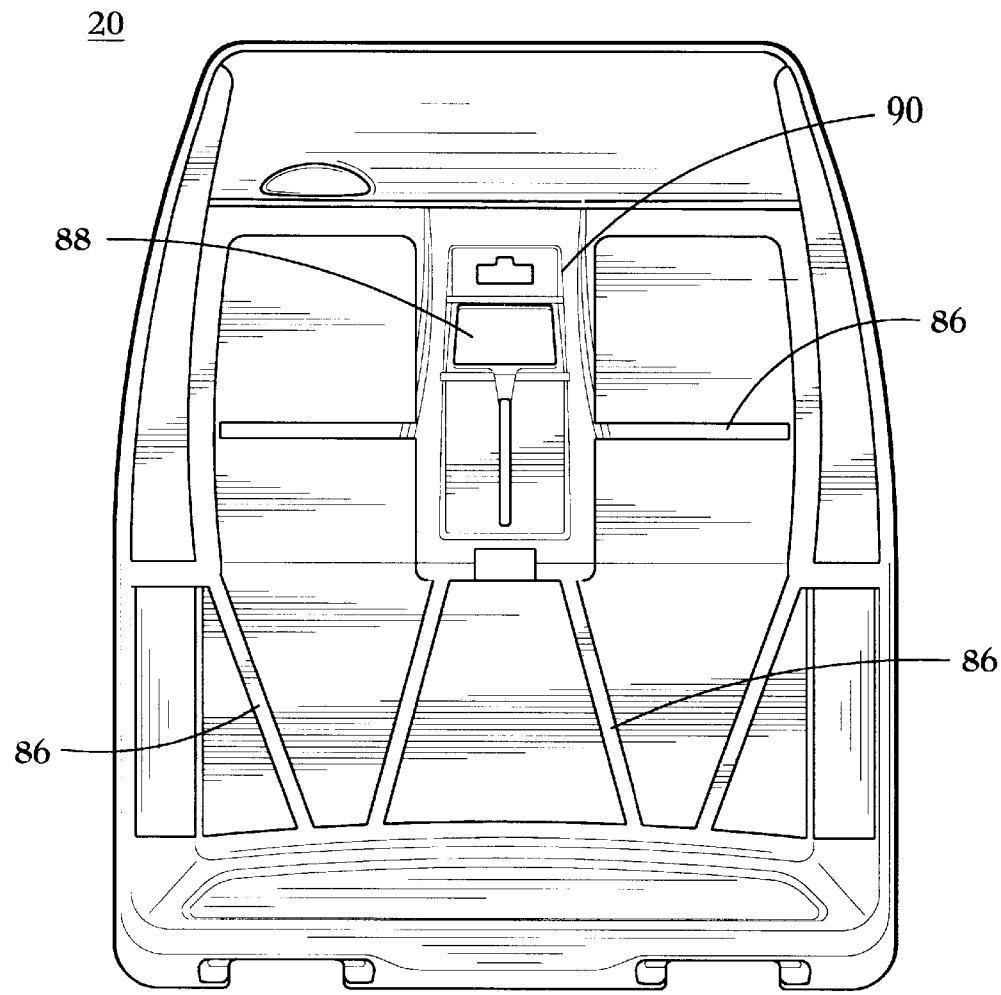
FIG. 13 shows an underside view of the upper body of FIG. 1.

Referring to FIGS. 12A–16, the upper body portion 20 includes a number of features molded therein for enhancing the structural integrity thereof. In one particular embodiment, the upper body 20 has a chamfered shape and includes curved sections 80, 82 and 84 molded into the outer surface thereof. The chamfering and molded curves enhance the structural integrity of the design. Referring to FIG. 13, the upper body 20 preferably includes one or more internal support ribs 86 integrally molded into the inner skin. Although the support ribs 86 may extend across the width of or the length of the upper body, the support ribs are generally not visible from the exterior surface of the trailer (see FIGS. 12A and 12B), thereby enhancing the aesthetic appearance of the upper body.

Figure 16:
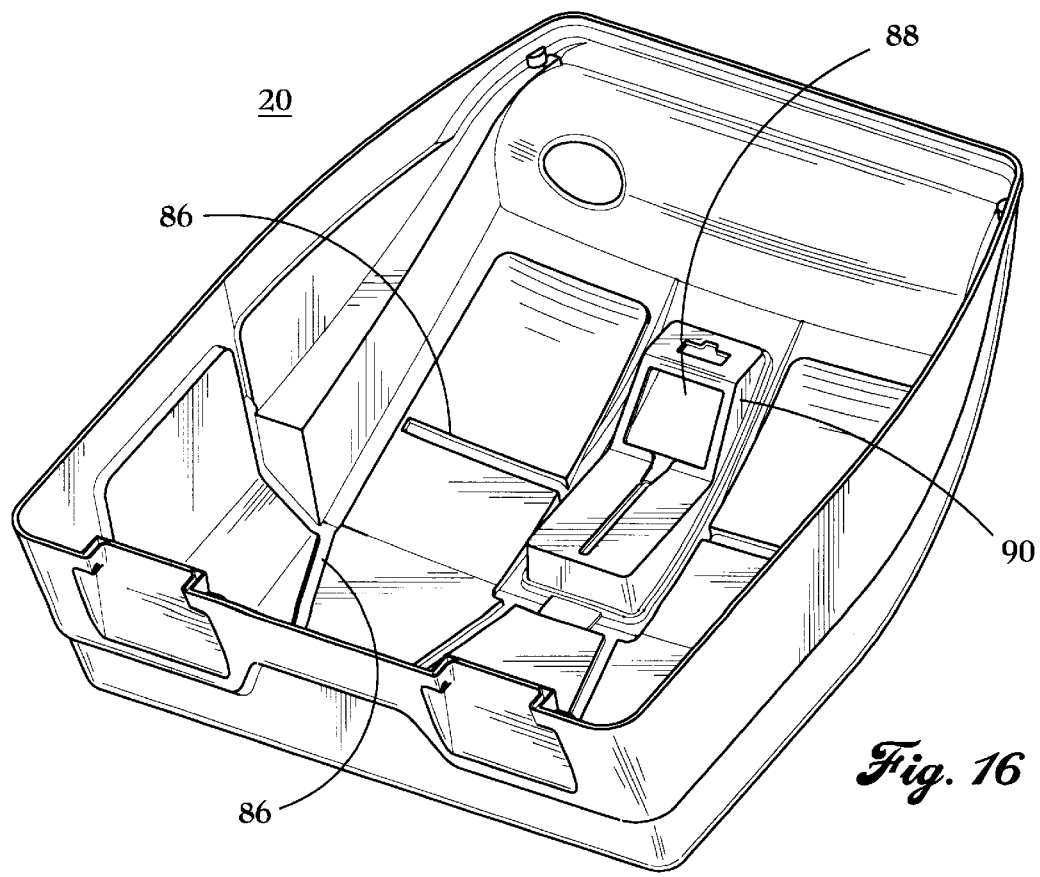
FIG. 16 shows a perspective view of the underside of the upper body of FIG. 1.

Referring to FIGS. 13–16, the upper body 20 also includes an instrument panel aperture 88 molded therein which provides access to an instrument panel (not shown) for the air compressor. As shown in FIGS. 13 and 16, the instrument panel aperture 88 preferably has supports ribs 90 integrally molded around the interior perimeter thereof for enhancing the structural integrity of that portion of the upper body.

Figure 14:
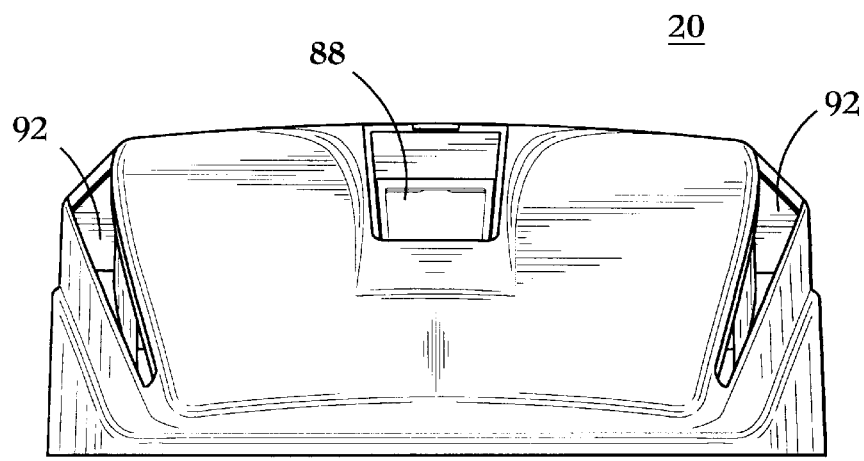
FIG. 14 shows a rear view of the upper body of FIG. 1.
Figure 15:
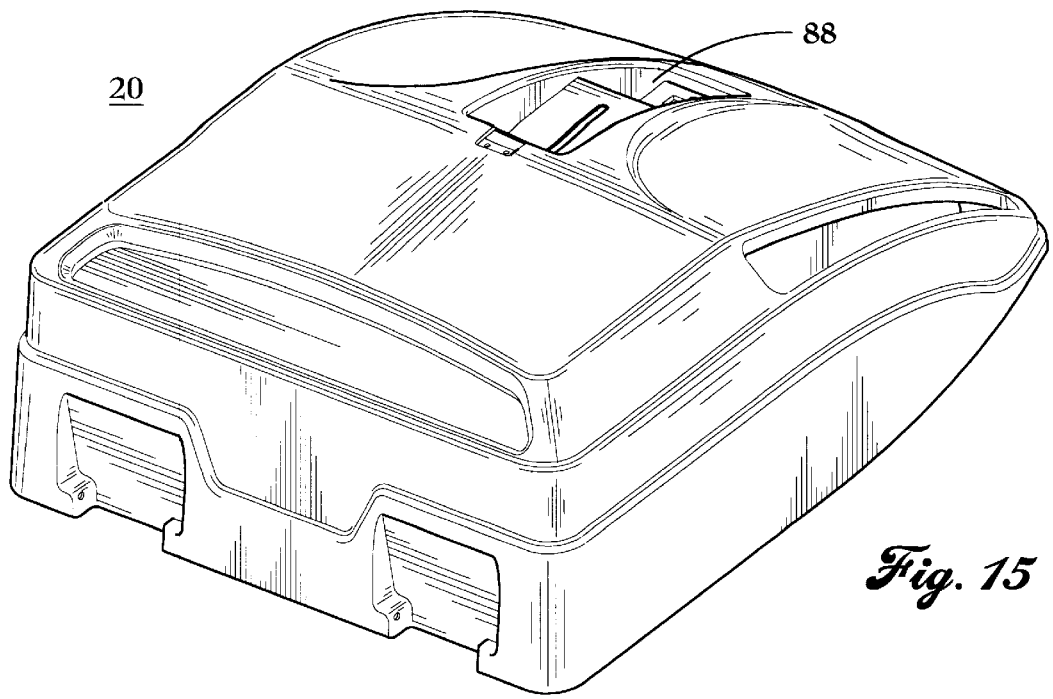
FIG. 15 shows a perspective view of the upper body of FIG. 1.

Referring to FIGS. 12A, 12B and 14, the upper body 20 preferably includes one or more air intake openings 92 molded therein for providing a continuous supply of air to the engine compartment. The air intake openings 92 are interconnected with internal ducting (not shown) formed between the inner and outer skins of the upper body portion. The internal ducting transfers the air to specified locations within engine compartment so that a fresh supply of air may be continuously provided to the engine. In the particular embodiment shown in FIGS. 12A and 12B, the air intake openings are located near a rear end of the trailer, between curves 80 and 82 molded into the exterior surface of the upper body. The air intake opening is interconnected with one or more drain channels so that any water or moisture entering the air intake may be discharged from the trailer. In one particular embodiment, the alignment channel (FIG. 10) formed atop the lower body 12 has openings formed therein so that the water from the air intake may be directed to the alignment channel and passed outside the trailer.

Figure 17:
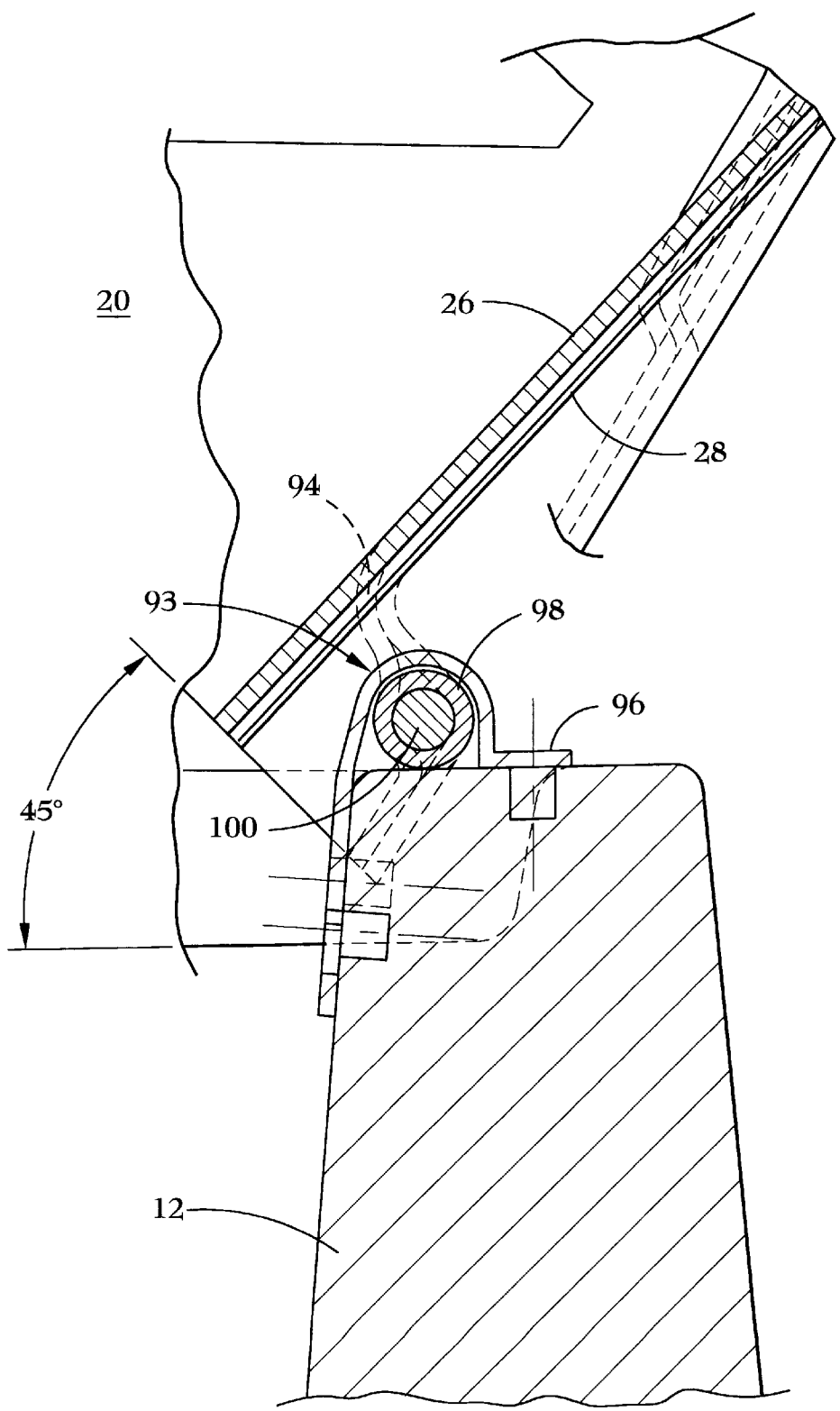
FIG. 17 shows a cross-sectional side view of a hinge for connecting the upper and lower bodies of FIG. 1, in accordance with certain preferred embodiments of the present invention.
Figure 18:
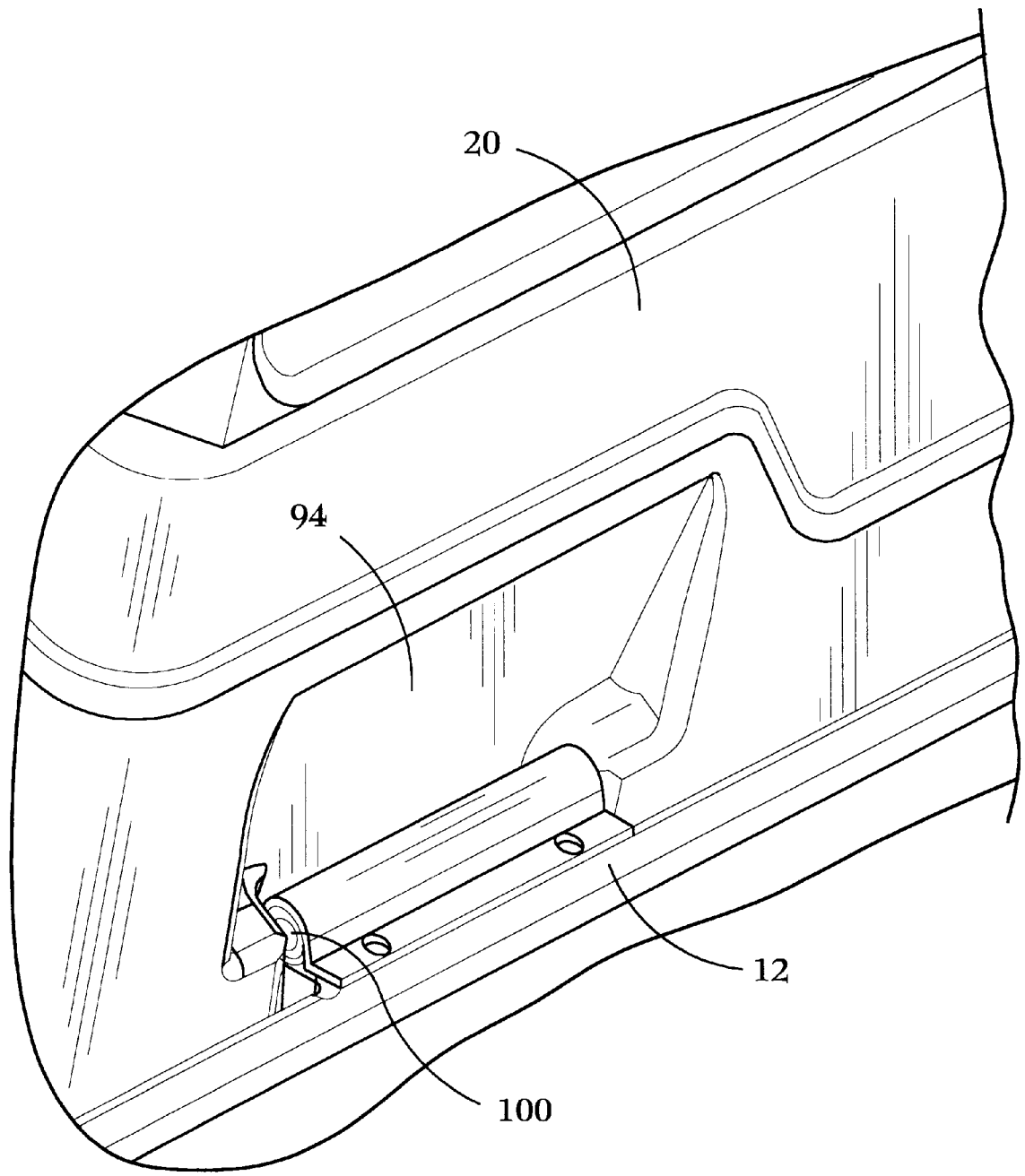
FIG. 18 shows a perspective view of the hinge of FIG. 17.
Figure 19:
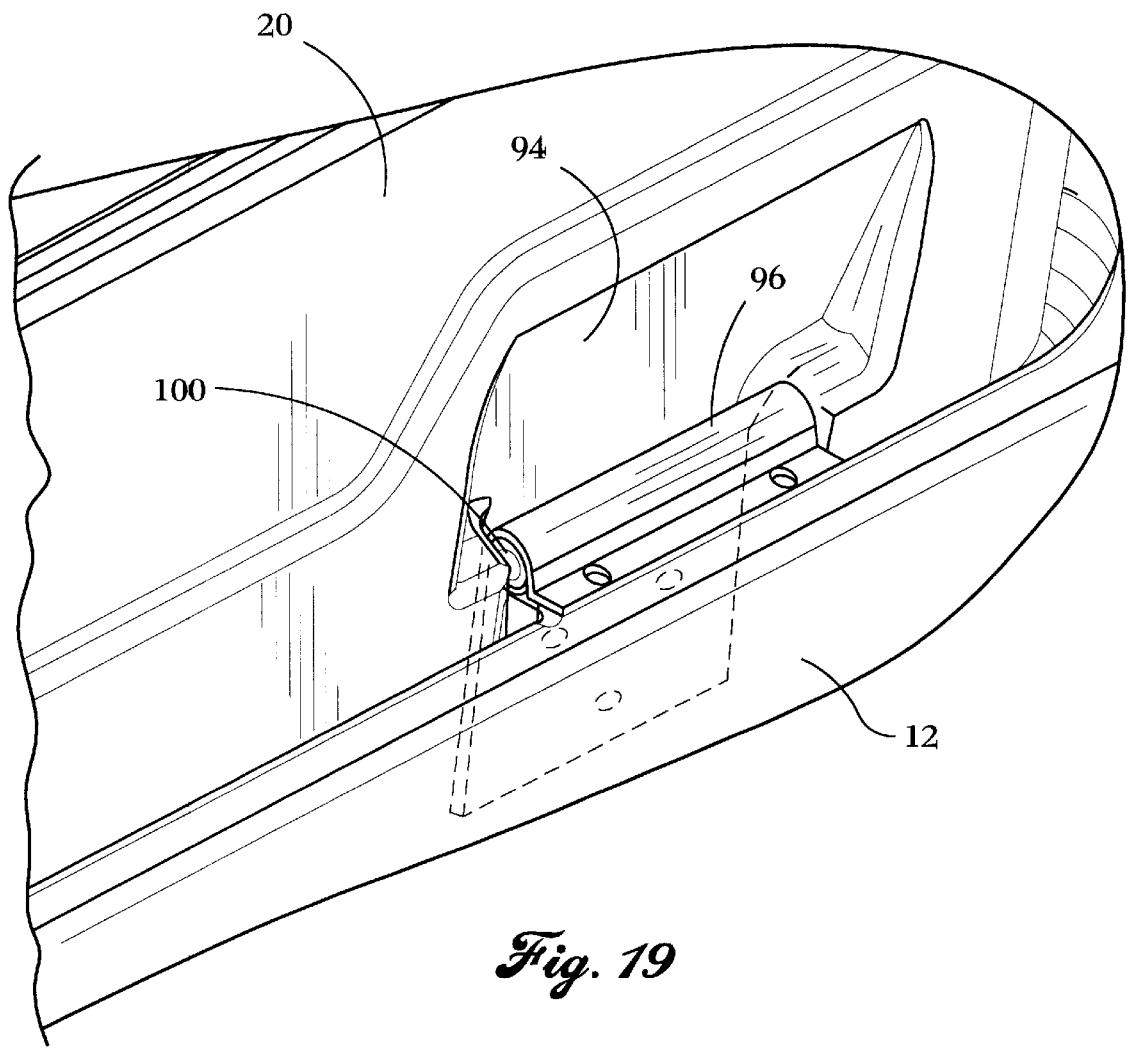
FIG. 19 shows a perspective view of the hinge of FIG. 17, in accordance with further preferred embodiments of the present invention.

Referring to FIGS. 17–19, the trailer includes one or more hinges 93 used to hingedly secure the upper body 20 to the lower body 12. Each hinge 93 includes an upper hinge portion 94 that is molded between the inner and outer skins 26 and 28 of the upper body 20. The upper hinge portion 94 is essentially trapped between the inner and outer skins of the upper body, thereby minimizing stress concentrations on the upper body where the hinge is attached to the upper body. In prior art embodiments, hinges have been attached to a body portion using fasteners such as screws; however, the use of screws tends to create high stress concentration areas. The present design avoids the generation of these high stress concentration areas by providing a greater area over which the stresses from the hinge are transferred to the upper body portion. Referring to FIG. 17, the hinge 93 may also include a hinge tube clamp 96 secured to the lower body 12. The hinge tube clamp 96 may be secured in place by a wide variety of techniques such as by using screws, nuts and bolts or adhesive. The hinge 93 also preferably includes a hinge tube 98, such as a steel or polymer hinge tube, secured in place within the hinge tube clamp 96. The hinge also preferably includes a hinge pin 100 which interconnects the upper hinge portion 94 and the hinge tube clamp 96, which, in turn, interconnects the upper body 20 with the lower body 12. The hinge pin 100 preferably includes a durable material such as steel. The ends of the hinge pin 100 may fit within recesses formed in the upper hinge portion, as shown in FIGS. 18 and 19.

It will therefore be readily understood by those skilled in the art that the present invention may be used for a broad array of functions and applications and that many embodiments and adaptations of the present invention, other than those described herein, will be apparent from or reasonably suggested by the foregoing description without departing from the substance or scope of the present invention. For example, the enclosure disclosed herein may be utilized for portable light towers, portable generators or portable compressors. Accordingly, while the present invention has been described in relation to its preferred embodiment, it is to be understood that this disclosure is only illustrative and exemplary of the present invention and is made merely for purposes of providing a full and enabling disclosure. The foregoing is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An enclosure for a portable machine comprising:
    A lower body having two or more wheels rotatably mounted thereto, the lower body including an interior region adapted for receiving the portable machine the lower body having a lower body coefficient of thermal expansion;
    an upper body overlying the lower body for enclosing the portable machine within the interior region, the upper body having an upper body coefficient of thermal expansion, said upper body coefficient of thermal expansion being different than the lower body coefficient of thermal expansion; and
    a towing element attached to the lower body for pulling said enclosure over a surface, wherein said upper and lower bodies substantially comprise polymer materials for minimizing the amount of noise emanating from said enclosure during operation of said machine.

2. The enclosure as claimed in claim 1, wherein said lower body includes materials selected from the group consisting of polyethylene and nylon.

3. The enclosure as claimed in claim 1, wherein said upper body includes acrylonitrile butadiene styrene (ABS).

4. The enclosure as claimed in claim 1, wherein said upper and lower bodies are formed using a molding process.

5. The enclosure as claimed in claim 4, wherein said upper body is molded using a vacuum molding process.

6. The enclosure as claimed in claim 1, wherein said enclosure has a tear drop shape for generating favorable air flow patterns when said enclosure is pulled over said surface so as to enhance stability.

7. The enclosure as claimed in claim 1, wherein said enclosure includes the front end and a rear end remote therefrom, the upper body having an outer skin which curves downward toward the surface from the front end to the rear end of the enclosure.

8. The enclosure as claimed in claim 1, wherein the upper body is secured to said lower body.

9. The enclosure as claimed in claim 1, wherein said upper body is hingedly secured to the lower body.

10. The enclosure as claimed in claim 9, wherein said portable machine is secured within the interior region of said lower body and wherein said upper body is movable with respect to said lower body for selectively accessing said portable machine.

11. The enclosure as claimed in claim 9 wherein the hinge includes an upper hinge portion, attached to the upper body, a hinge tube clamp secured to the lower body; and a hinge tube extending through the hinge tube clamp; and hinge pin interconnecting the hinge tube and upper hinge.

12. The enclosure as claimed in claim 11 wherein the upper body has inner and outer skins and the upper hinge portion is molded between the inner and outer skins.

13. The enclosure as claimed in claim 1, wherein said lower body includes an alignment channel integrally molded into an upper portion thereof for receiving at least one bottom edge of said upper body.

14. The enclosure as claimed in claim 11, wherein engagement of said at least one bottom edge of said upper body and the alignment channel of said lower body generally aligns said upper body relative to said lower body.

15. The enclosure as claimed in claim 14, wherein said alignment channel provides lateral support for said at least one bottom edge of said lower body for preventing collapse and/or deformation of the upper body.

16. The enclosure as claimed in claim 1, wherein said towing element includes a tow bar connected to the lower body and projecting from a front end thereof.

17. The enclosure as claimed in claim 16, wherein said tow bar is adjustable for modifying the height of the front end of the lower body above said surface.

18. The enclosure as claimed in claim 1, wherein said enclosure including said portable machine has an overall weight of approximately 375–425 kilograms.

19. The enclosure as claimed in claim 1 wherein the lower body portion includes a floor with a plurality of flow channels along the floor, and a drain flow connected to the channels.

20. The enclosure as claimed in claim 19 wherein the drain is closed by a removable plug.

21. The enclosure as claimed in claim 19 the lower body having an exterior wall, and wherein the drain has a recessed conical shape along the floor and has a raised conical shape along the exterior wall of the lower body portion.

22. The enclosure as claimed in claim 19 wherein the flow channels are comprised of a longitudinally extending channel and a plurality of substantially laterally extending channels flow connected to the longitudinally extending channel; the drain being located along the length of one of the laterally extending flow channels.

23. An enclosure for a portable machine comprising:
 at least one fender including one or more flanges projecting therefrom;
 a lower body having two or more wheels rotatably mounted thereto, the lower body including an interior region adapted for receiving the portable machine, said lower body also including one or more integrally molded location channels for positioning and mounting the at least one fender to said lower body, the one or more integrally molded location channels including recesses adapted for receiving the flanges projecting from said fenders;
 an upper body overlying the lower body for enclosing the portable machine within the interior region; and
 a towing element attached to the lower body for pulling said enclosure over a surface, wherein said upper and lower bodies substantially comprise polymer materials for minimizing the amount of noise emanating from said enclosure during operation of said machine.

24. An enclosure for a portable machine comprising:
 a lower body having two or more wheels rotatably mounted thereto, the lower body including an interior region adapted for receiving the portable machine the lower body having a lower body coefficient of thermal expansion;
 an upper body overlying the lower body for enclosing the portable machine within the interior region, the upper body having an upper body coefficient of thermal expansion, said upper body coefficient of thermal expansion being different than the lower body coefficient of thermal expansion; and
 a towing element attached to the lower body for pulling said enclosure over a surface.

25. The enclosure as claimed in claim 24, wherein said lower body includes materials selected from the group consisting of polyethylene and nylon.

26. The enclosure as claimed in claim 24, wherein said upper body includes acrylonitrile butadiene styrene (ABS).

27. The enclosure as claimed in claim 24, wherein said enclosure has a tear drop shape for generating favorable air flow patterns when said enclosure is pulled over said surface so as to enhance stability.

28. The enclosure as claimed in claim 24, wherein said enclosure includes the front end and a rear end remote therefrom, the upper body having an outer skin which curves downward toward the surface from the front end to the rear end of the enclosure.

* * * * *